United States Patent
Kumita et al.

(10) Patent No.: US 12,293,639 B2
(45) Date of Patent: May 6, 2025

(54) INFORMATION PROCESSING DEVICE FOR RANDOMLY DETERMINING WHETHER TO REARRANGE SYMBOLS IN ARRANGEMENT PATTERN CORRESPONDING TO SPECIFIC PAYOUT

(71) Applicant: Universal Entertainment Corporation, Tokyo (JP)

(72) Inventors: Atsushi Kumita, Tokyo (JP); Toshikazu Jinnouchi, Tokyo (JP); Muneki Shiraishi, Tokyo (JP); Satoko Baba, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 243 days.

(21) Appl. No.: 17/795,388

(22) PCT Filed: Jan. 22, 2021

(86) PCT No.: PCT/JP2021/002217
§ 371 (c)(1),
(2) Date: Jul. 26, 2022

(87) PCT Pub. No.: WO2021/153448
PCT Pub. Date: Aug. 5, 2021

(65) Prior Publication Data
US 2023/0104927 A1    Apr. 6, 2023

(30) Foreign Application Priority Data
Jan. 31, 2020    (JP) .................... 2020-014394

(51) Int. Cl.
*A63F 13/00* (2014.01)
*A63F 9/24* (2006.01)
*G07F 17/32* (2006.01)

(52) U.S. Cl.
CPC ...... *G07F 17/3267* (2013.01); *G07F 17/3213* (2013.01)

(58) Field of Classification Search
None
See application file for complete search history.

(56) References Cited

U.S. PATENT DOCUMENTS

| 2008/0085772 A1* | 4/2008 | Iddings ................. G07F 17/322 463/42 |
| 2017/0046924 A1* | 2/2017 | Buriu ...................... G07F 17/34 |

FOREIGN PATENT DOCUMENTS

| JP | 2004-321486 | 11/2004 |
| JP | 2019-055062 | 4/2019 |

* cited by examiner

*Primary Examiner* — Lawrence S Galka
(74) *Attorney, Agent, or Firm* — LEX IP MEISTER, PLLC

(57) ABSTRACT

The present invention provides an information processing device and a program that can lower a difficulty level of clearing a predetermined condition and improve a continuation rate of a player.

The information processing device is configured to execute a game in which symbol random determination for determining symbols to be rearranged is executed, and when an arrangement pattern of the determined symbols corresponds to one of a plurality of kinds of preset arrangement patterns, a payout corresponding to the arrangement pattern is awarded, and the information processing device includes a controller programmed to execute a) a process of executing random determination as to whether to rearrange the symbols in an arrangement pattern corresponding to a specific payout among the payout, and b) a process of rearranging the symbols in the arrangement pattern corresponding to the specific payout and awarding the specific payout within a predetermined period of time regardless of whether the (Continued)

symbol random determination is executed, when a random determination result in the process a) wins a prize.

7 Claims, 10 Drawing Sheets

FIG. 4

PAYOUT TABLE

| Symbol | Graphics | 1 | 2 | 3 | 4 | 5 |
|---|---|---|---|---|---|---|
| WILD | | 0 | 0 | 0 | 0 | 0 |
| 7 | | 0 | 0 | 50 | 300 | 1000 |
| HEART | | 0 | 0 | 35 | 200 | 800 |
| BELL | | 0 | 0 | 30 | 100 | 500 |
| WATERMELON | | 0 | 0 | 20 | 5 | 300 |
| CHERRY | | 0 | 0 | 15 | 35 | 300 |
| ACE | A | 0 | 0 | 10 | 30 | 200 |
| KING | K | 0 | 0 | 10 | 20 | 200 |
| QUEEN | Q | 0 | 0 | 10 | 15 | 100 |
| JACK | J | 0 | 0 | 10 | 15 | 100 |
| TEN | 10 | 0 | 0 | 5 | 15 | 100 |
| NINE | 9 | 0 | 0 | 5 | 10 | 100 |

| Symbol | Graphics | 1 | 2 | 3 | 4 | 5 |
|---|---|---|---|---|---|---|
| BONUS | | 0 | 0 | 5FG | 10FG | 20FG |

INFORMATION PROCESSING DEVICE FOR RANDOMLY DETERMINING WHETHER TO REARRANGE SYMBOLS IN ARRANGEMENT PATTERN CORRESPONDING TO SPECIFIC PAYOUT

TECHNICAL FIELD

The present invention relates to an information processing device and a game program.

BACKGROUND ART

In recent years, in smartphones or social games (server management) in which a game application is installed, a game progresses by a player operating an operation panel or a touch panel of the smartphone.

Such a game includes a slot game in which symbols to be rearranged are determined by random determination (symbol random determination), a symbol arrangement pattern determined by the symbol random determination is displayed on a screen, and a prize is awarded according to the displayed symbol arrangement pattern (see PTL 1).

In addition, in such a game, when a predetermined condition is satisfied, an effect advantageous to the player may be exhibited. For example, a probability of displaying a symbol arrangement pattern corresponding to a predetermined prize is improved within a predetermined period of time. As a result, a new game stage may be started. Such a predetermined condition is referred to as a quest or a mission in the game, but in general, the mission is more compulsory, and when the mission is cleared, the accompanying quest may be released.

CITATION LIST

Patent Literature

PTL 1: U.S. Pat. No. 8,684,816

SUMMARY OF INVENTION

Technical Problem

However, when the predetermined condition cannot be achieved or is difficult to achieve, the number of cases in which the player does not continue playing the game and does not restart the game to continue playing after leaving the game may be increased. When a social game is continuously operated for a long period of time, a decrease in the number of players who continuously play the game greatly influences continuation of the operation.

As a method for solving such a problem, for example, a method of improving only a winning probability of a symbol arrangement pattern satisfying the condition and lowering a difficulty level of clearing a condition can be considered, and there are many kinds of prizes awarded according to the symbol arrangement pattern. Thus, in a case of attempting to improve only a winning probability of an arrangement pattern corresponding to a special prize at a predetermined timing among the many kinds of prizes, it is necessary to take measures such as lowering a winning probability of an arrangement pattern corresponding to each of other prizes unrelated to the special prize, which may complicate construction of a control program thereof.

Therefore, an object of the present invention is to provide an information processing device and a program that can lower a difficulty level of clearing a predetermined condition and improve a continuation rate of a player.

Solution to Problems

An information processing device according to the present invention is an information processing device configured to execute a game in which symbol random determination for determining symbols to be rearranged is executed, and when an arrangement pattern of the determined symbols corresponds to one of a plurality of kinds of preset arrangement patterns, payout corresponding to the arrangement pattern is awarded, and includes:

a controller programmed to execute
 a) a process of executing random determination as to whether to rearrange the symbols in an arrangement pattern corresponding to a specific payout among the payout, and
 b) a process of rearranging the symbols in the arrangement pattern corresponding to the specific payout and awarding the specific payout in any unit game executed within a predetermined period of time (a period of time until a predetermined game count is exhausted) regardless of whether the symbol random determination is executed, when a random determination result in the process a) wins a prize.

In the above configuration, in repeatedly executing the game, when a random determination result for awarding the specific payout wins a prize, the arrangement pattern corresponding to the specific payout is rearranged within the predetermined period of time regardless of whether the symbol random determination for determining the symbol arrangement pattern is executed. Accordingly, when there are a plurality of kinds of arrangement patterns, a state in which the specific payout is awarded within the predetermined period of time can be generated without making the player aware that random determination for awarding the specific payout is executed, a probability that a predetermined payout is awarded can be easily improved, a difficulty level of the game is lowered accordingly, and a continuation rate of a player for the game can be improved.

In addition, the information processing device according to the present invention is the above information processing device, in which
 the controller executes
  a quest including a plurality of the games to be sequentially executed, and
  c) a process of granting a right to execute a new quest when a predetermined condition is cleared due to accumulation of payouts.

In the above configuration, it is possible to make it easier for a player to receive a privilege of starting a new quest.

Further, the information processing device according to the present invention is the above information processing device, in which
 the controller further executes
  d) a process of, when the random determination result in the process a) wins a prize and the quest is completed before the symbols are rearranged in the arrangement pattern corresponding to the specific payout in the process b), passing on the winning result to a next quest.

In the above configuration, in a case where the quest is completed before a winning result of rearranging the symbols in the arrangement pattern corresponding to the specific payout is executed even though the winning result is obtained, when the winning result is passed on to a next quest, the payout can be generated in executing a plurality of quests even when a specific payout is not generated due to the winning result in one quest.

Furthermore, the present invention relates to a game program to be executed by an information processing device configured to execute a game in which symbol random determination for determining symbols to be rearranged is executed, and when an arrangement pattern of the determined symbols corresponds to one of a plurality of kinds of preset arrangement patterns, a payout corresponding to the arrangement pattern is awarded, the game program causing the following processes to be executed in executing the game a) a process of executing random determination as to whether to rearrange the symbols in an arrangement pattern corresponding to a specific payout among the payout, and b) a process of rearranging the symbols in the arrangement pattern corresponding to the specific payout and awarding the specific payout within a predetermined period of time regardless of whether the symbol random determination is executed, when a random determination result in the process a) wins a prize.

Advantageous Effects of Invention

According to the present invention, it is possible to provide an information processing device and a program that can lower a difficulty level of clearing a predetermined condition and improve a continuation rate of a player.

BRIEF DESCRIPTION OF DRAWINGS

FIG. 4 is a schematic diagram showing a payout table (payout information) according to the embodiment of the present invention;

DESCRIPTION OF EMBODIMENTS

Embodiments

An information processing device according to the present embodiment will be described with reference to the drawings.

An information processing device 1 is connected to a server 10 via an Internet line 101 so as to be capable of data communication, and a game system 100 including the information processing device 1 and the server 10 is formed. It should be noted that the game system 100 is not limited thereto and may be formed only by the information processing device 1. Further, the information processing device 1 may mean a game system itself including a server and a terminal device such as a smartphone. Further, a function of the information processing device 1 described in the present embodiment may be a function of any of components of the game system.

A common application is installed in a plurality of information processing devices 1 via the server 10 or the like corresponding to an operating system (OS) of each information processing device 1. In the present embodiment, a slot game is playable as a game element in the application installed in the information processing device 1. That is, a user can play the slot game on this application. It should be noted that the slot game may be an add-in of the application. That is, the slot game may be provided as an additional function of the application by the server 10 or the like independently from the application. Further, in the application, a plurality of kinds of slot games having different effect modes and rules may be playable. It should be noted that the application may be a web browser.

Although details will be described later, the slot game is started on the premise of consumption of an accumulable game value. When a winning is achieved as a result of the slot game, a game value corresponding to a kind of the winning and the consumed game value is added to the accumulated game value as a payout. Thus, the information processing device 1 executes the slot game in which the accumulable game value is increased or decreased in accordance with a result. The game value may be information (game point) which is used exclusively for starting the slot game and does not have a monetary value or may be electronic valuable information having a monetary value.

Figure 1:
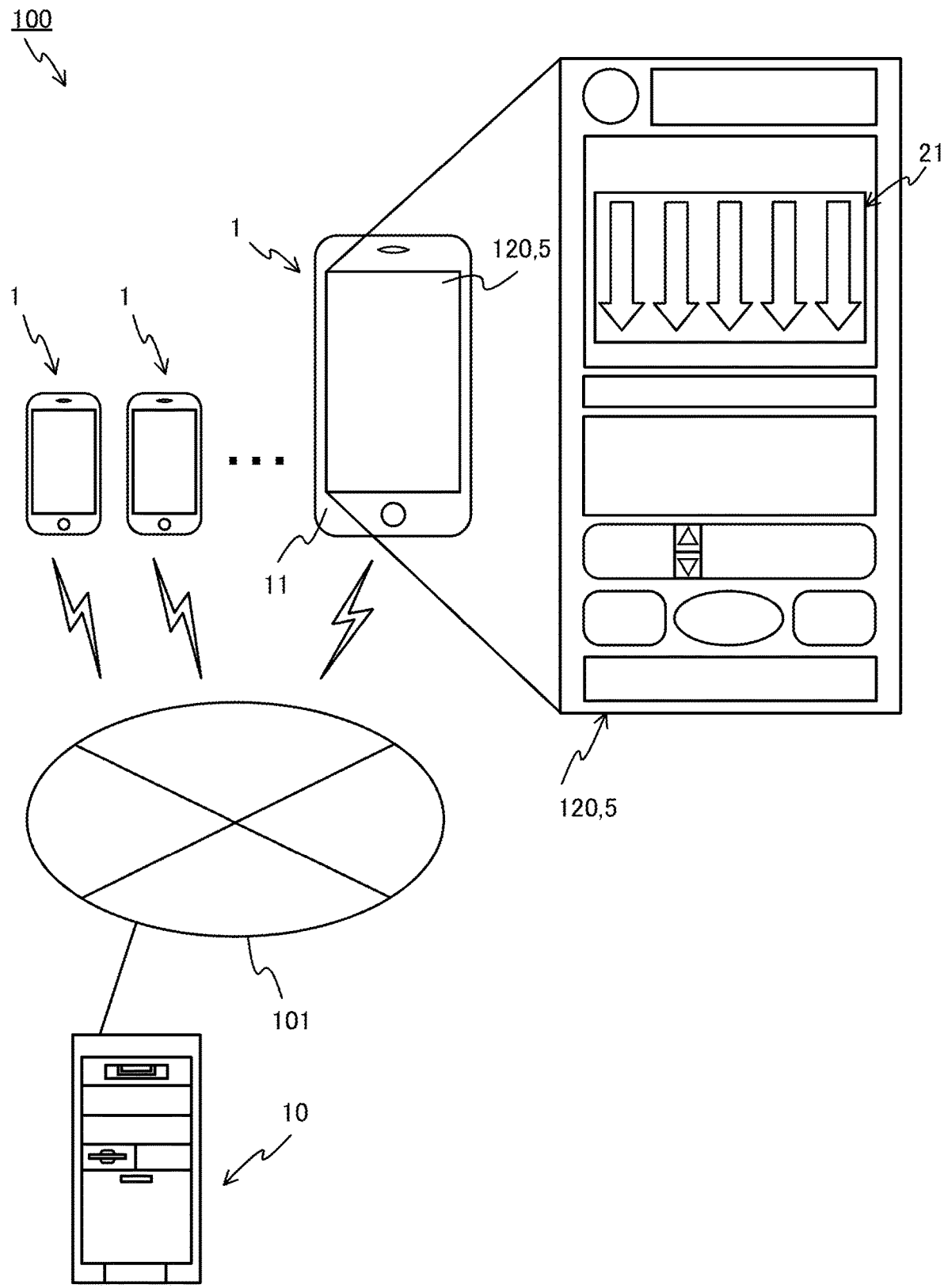
FIG. 1 is a block diagram showing a game system according to an embodiment of the present invention.

As shown in FIG. 1, the information processing device 1 exemplified in the present embodiment is a so-called smartphone, and includes a display 120 provided on a front surface of a housing 11 and a touch panel 5 provided on the entire surface of the display 120. The display 120 is provided with a symbol display area 21 in which variable display and stop display of a symbol are performed when the game is started.

In the present embodiment, the information processing device 1 is exemplified as a smartphone, but the information processing device 1 may be a portable device or a stationary device. Examples of the portable information processing device 1 include portable information devices such as a portable computer, a laptop computer, a tablet personal computer, a handheld personal computer, and a personal data assistant (PDA).

Figure 2:
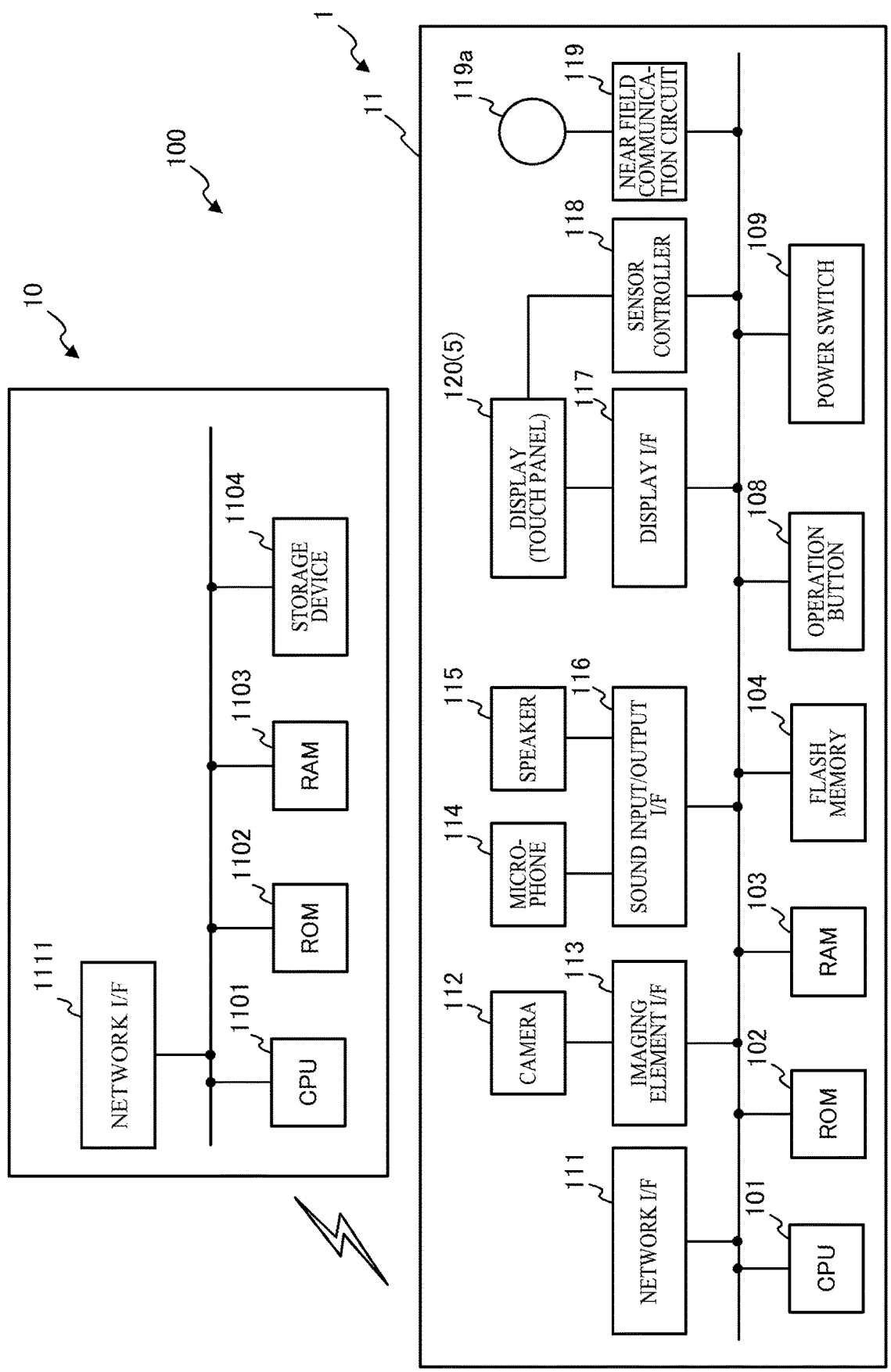
FIG. 2 is a block diagram showing a configuration of a smartphone (information processing device) and a server according to the embodiment of the present invention.

As shown in FIG. 2, the smartphone 1 includes, in the housing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna 119a of the near field communication circuit 119. Further, the display 120 provided with the touch panel 5 (input unit) is incorporated on the front surface of the housing 11.

The display 120 is formed to be able to display an image. Examples of a display method of the display 120 include various display methods such as a liquid crystal method, an organic electroluminescence method, a cathode ray tube (CRT) method, and a plasma method.

The central processing unit (CPU) 101 controls an operation of the entire smartphone 1. The read only memory (ROM) 102 stores a program used for driving the CPU 101 such as an initial program loader (IPL).

The random access memory (RAM) 103 is used as a work area of the CPU 101. The flash memory 104 stores various data such as application software (program), a communication program, image data, and sound data for executing the game in the present embodiment. The operation button 108 is a button operated when the smartphone 1 is initially set. The power switch 109 is a switch for switching ON/OFF of a power of the smartphone 1.

The network interface (I/F) 111 is an interface for performing data communication with the server 10 or the like by using a communication network such as the Internet. The camera 112 is a kind of built-in type imaging unit that images a subject to obtain image data under the control of the CPU 101. The imaging element I/F 113 is a circuit that controls the drive of the camera 112. The microphone 114 is a kind of built-in type sound collection unit that inputs sound. The sound input/output I/F 116 is a circuit that processes input/output of a sound signal between the microphone 114 and the speaker 115 under the control of the CPU 101. The display I/F 117 is a circuit that transmits the image data to the display 120 under the control of the CPU 101. The sensor controller 118 is a circuit that receives input from the touch panel 5 provided on the display 120. The near field communication circuit 119 is a communication circuit such as near field communication (NFC) (registered trademark) and Bluetooth (registered trademark). The bus line 110 is an address bus or a data bus for electrically connecting components such as the CPU 101.

In addition, the server 10 is a so-called computer including a CPU 1101, a ROM 1102, a RAM 1103, a storage device 1104 such as a hard disk drive, and a network I/F 1111, and provides an application to the smartphone 1 and is used when a slot game administrator or the like operates and manages a social game service. The CPU 1101 functions as a main component of a controller in the server 10 and controls an operation of the entire server 10. The read only memory (ROM) 1102 stores a program used for driving the CPU 101 such as an initial program loader (IPL). The RAM 1103 is used as a work area of the CPU 1101. The storage device 1104 functions as a database and is a computer-readable non-transitory recording medium that stores game data for each of the plurality of information processing devices 1. The server 10 appropriately refers to the database of the storage device 1104 and returns a response to a request from a game program of the information processing device 1. The network I/F 1111 is an interface for performing data communication by using a communication network such as the Internet.

(Outline of Slot Game)

Figure 3:
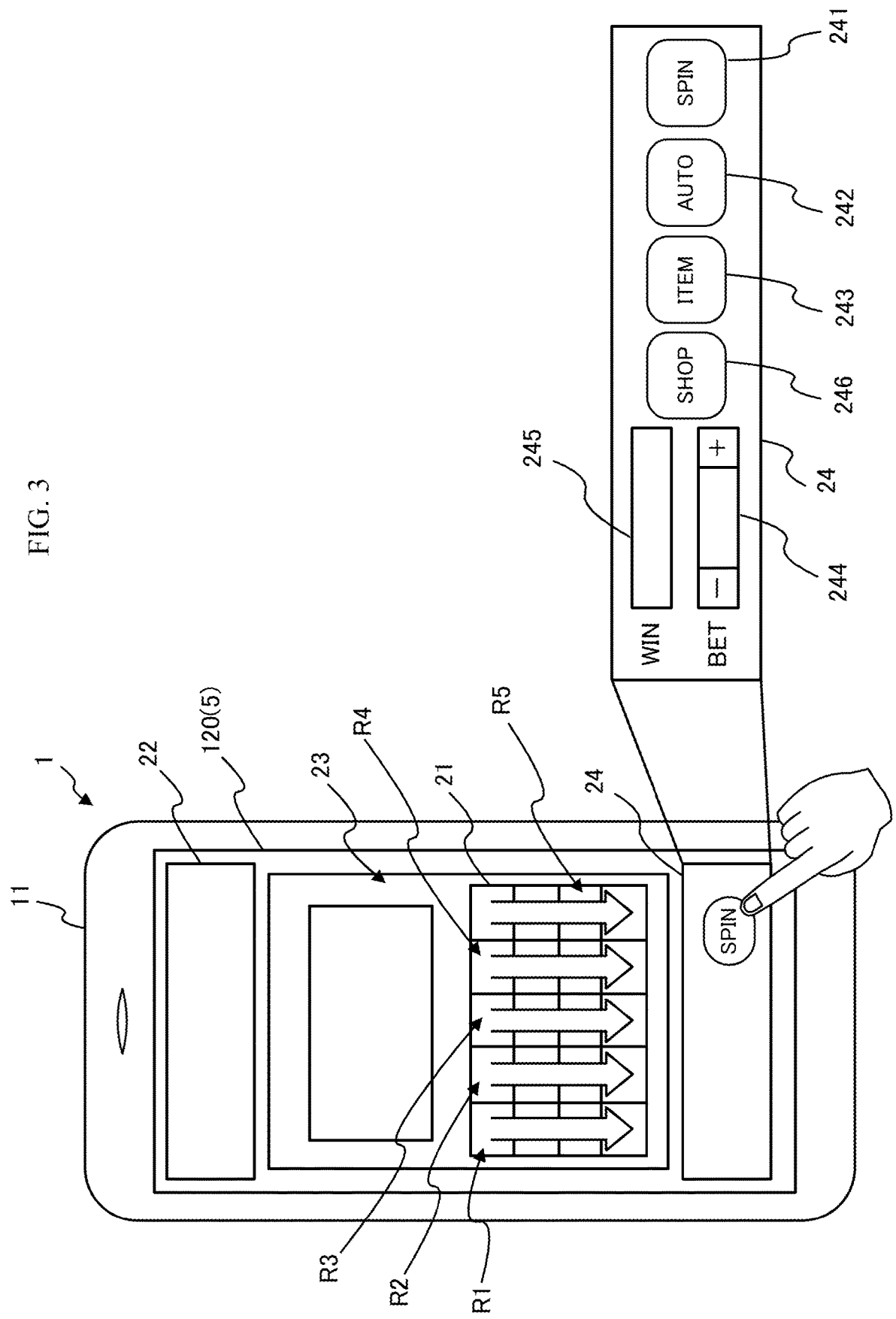
FIG. 3 is a diagram showing a display state of a slot game on the smartphone (information processing device) according to the embodiment of the present invention.

The slot game is playable by a user as a game element in the application installed on the smartphone 1. In the application installed on the smartphone 1, when there is a request from the smartphone 1, an effect image/video or the like of the slot game is displayed on the display 120 of the smartphone 1. Then, when a selection image for starting a "slot game" is selected by using the touch panel 5, the slot game is started by the application. For example, when the slot game is started, as shown in FIG. 3, a slot game in which a plurality of symbols are rearranged in the symbol display area 21 including 20 areas in a matrix of 5 columns×4 rows can be executed.

It should be noted that a plurality of kinds of executable slot games may be prepared, and a rule, a payout mode, and an effect image may be different depending on a kind of the slot game to be executed. For example, in a certain kind of "slot game", a slot game in which a plurality of symbols are rearranged in a symbol display area including nine areas in a matrix of 3 columns×3 rows is executed. In this slot game, a winning is determined by a combination of symbols rearranged on a payline (winning determination) set only at a middle stage of the symbol display area.

Here, when the slot game in the present embodiment is started, basically, a predetermined amount of coin (game medium) possessed by the player is consumed, and the slot game can be started as an equivalent for the consumption of the coin. It should be noted that when a predetermined condition is satisfied, the slot game can be started without consuming the coin (for example, when a condition for awarding a free game is satisfied, or a case in which the slot game can be played up to a predetermined count per day without consuming the coin).

The coin possessed by the player is electronic information, and the player can access the server 10 from the smartphone 1 and exchange a credit for the coin according to a payment method specified by a slot game operating organization. The coin possessed by the player is used in a wide variety of ways such as being consumed as an equivalent (purchase of an item) for obtaining an effect that influences the slot game, or being consumed as an equivalent for changing an appearance of a character that represents the player.

It should be noted that the game medium is not particularly limited, and may be electronic money or a game point that does not include valuable information.

(Slot Game: Definition)

The slot game to be executed in the present embodiment is a game in which a plurality of symbols are varied (scrolled videos of reels R1 to R4) and then stopped and displayed (rearranged) on the symbol display area 21, and a privilege (such as a payout or an item advantageous to the player) is awarded by a combination of the symbols displayed on the symbol display area 21 (symbol arrangement pattern), as shown in FIG. 3. It should be noted that a state in which the plurality of symbols are stopped and displayed after being varied on the symbol display area 21 is referred to as "rearranged".

The payout awarded by the combination of the symbols displayed on the symbol display area 21 is awarding the coin.

The term "unit game" is a series of operations from a start of accepting a bet to a state in which a prize can be established (a combination of symbols satisfies a predetermined relationship).

That is, the unit game is a state including a respective one of a bet time for accepting a bet, a game time for rearranging symbols, and a payout time of a payout process of awarding a payout.

(Slot Game Screen)

Next, the slot game screen displayed on the display 120 of the smartphone 1 will be described.

As shown in FIG. 3, when the slot game is executed, the slot game screen is displayed on the display 120. The symbol display area 21 that includes 20 areas in a matrix (on rows and columns) of 5 columns×4 rows, a game information display area 22 that displays information (such as the currently possessed count of coins) and the like related to an increase/decrease due to the execution of the slot game, an effect display area 23 that displays a game-related video or a game-related still image or a game-related message according to the start of the slot game, and an operation display area 24 that is to be operated by the player for the progress of the slot game are displayed on the slot game screen. A spin button 241, an AUTO button 242, an ITEM button 243, a bet button 244, a WIN display unit 245, and a shop button 246 are displayed on the operation display area 24.

The touch panel 5 transparent to the slot game screen is provided on the entire surface of the display 120. The touch panel 5 makes it possible to detect coordinates of a portion touched by a finger or the like of the player. Accordingly, for example, by touching an image of the spin button 241, the slot game (unit game) can be executed once. Further, by touching an image of the AUTO button 242, the slot game can be continuously executed without the player operating the spin button 241. Further, when an image of the ITEM button 243 is touched, the player can select and use an item acquired in the past (an effect that influences the slot game can be obtained). Further, when an image of the shop button 246 is touched, the player can access the server 10 from the smartphone 1, and move to a shop where a credit (one that can be paid with cash, credit card, electronic money, prepaid card or the like possessed by the player) can be exchanged for a coin and a credit or a coin can be exchanged for an item.

(Payline)

In the symbol display area 21, five video reels in which a plurality of symbols are arranged are separately scrolled and rearranged after a predetermined time is elapsed. As a result, a part of each video reel (four consecutive symbols in the present embodiment) is displayed to the player. In the symbol display area 21, one symbol is displayed on each of four areas of an upper stage, an upper center stage, a lower center stage, and a lower stage, depending on the video reels R1 to R4. That is, in the symbol display area 21, 20 symbols of 5 columns×4 rows are displayed (see FIG. 10).

In the present embodiment, a line formed by selecting one of the four areas of the upper stage, the upper center stage, the lower center stage, and the lower stage of each video reel and connecting those areas is referred to as the payline. A plurality of the paylines are set, and when three or more symbols of the same kind are continuously rearranged on one of the paylines, a winning is achieved (a payout is awarded). It should be noted that the number of paylines can be optionally employed.

(Video Reel)

Symbol columns including symbols corresponding to code numbers "0" to "33" are separately assigned to video reels R1 to R5 (FIG. 3). The kinds of the symbols arranged in the symbol columns of the video reels include a normal symbol such as "7", "HEART", "BELL", "WATERMELON", "CHERRY", "ACE", "KING", "QUEEN", "JACK", "10", and "9", a "BONUS" symbol whose occurrence results in a winning of BONUS which triggers the awarding of a free game, and a "WILD" symbol which is an all-purpose symbol (almighty symbol) that can replace any symbol. It should be noted that the "BONUS" symbol is a scatter symbol, and whether a "BONUS" winning is achieved is determined based on the number of "BONUS" symbols rearranged in the symbol display area 21 regardless of the payline.

Figure 6:
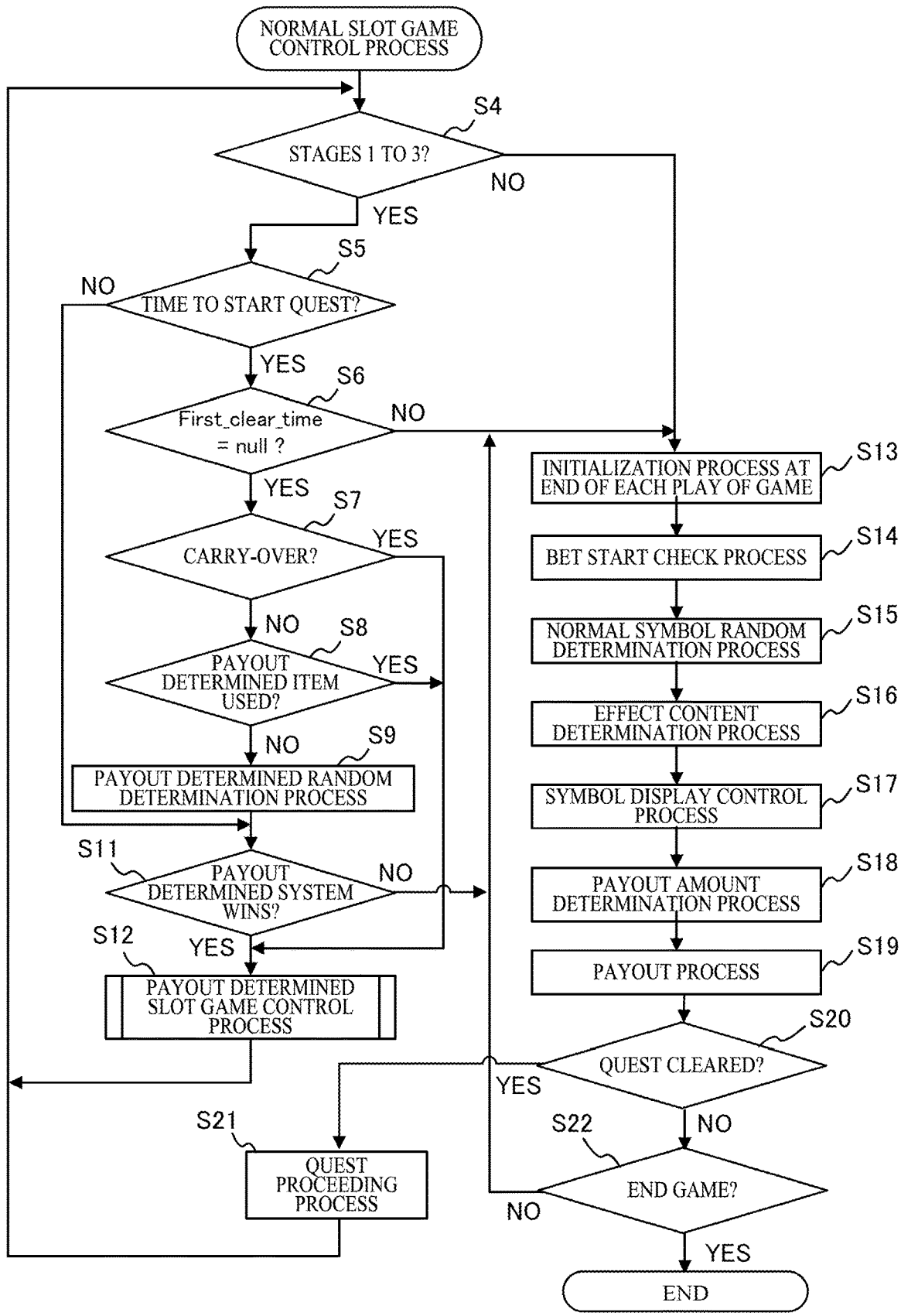
FIG. 6 is a flowchart showing a normal slot game control process according to the embodiment of the present invention.
Figure 7:
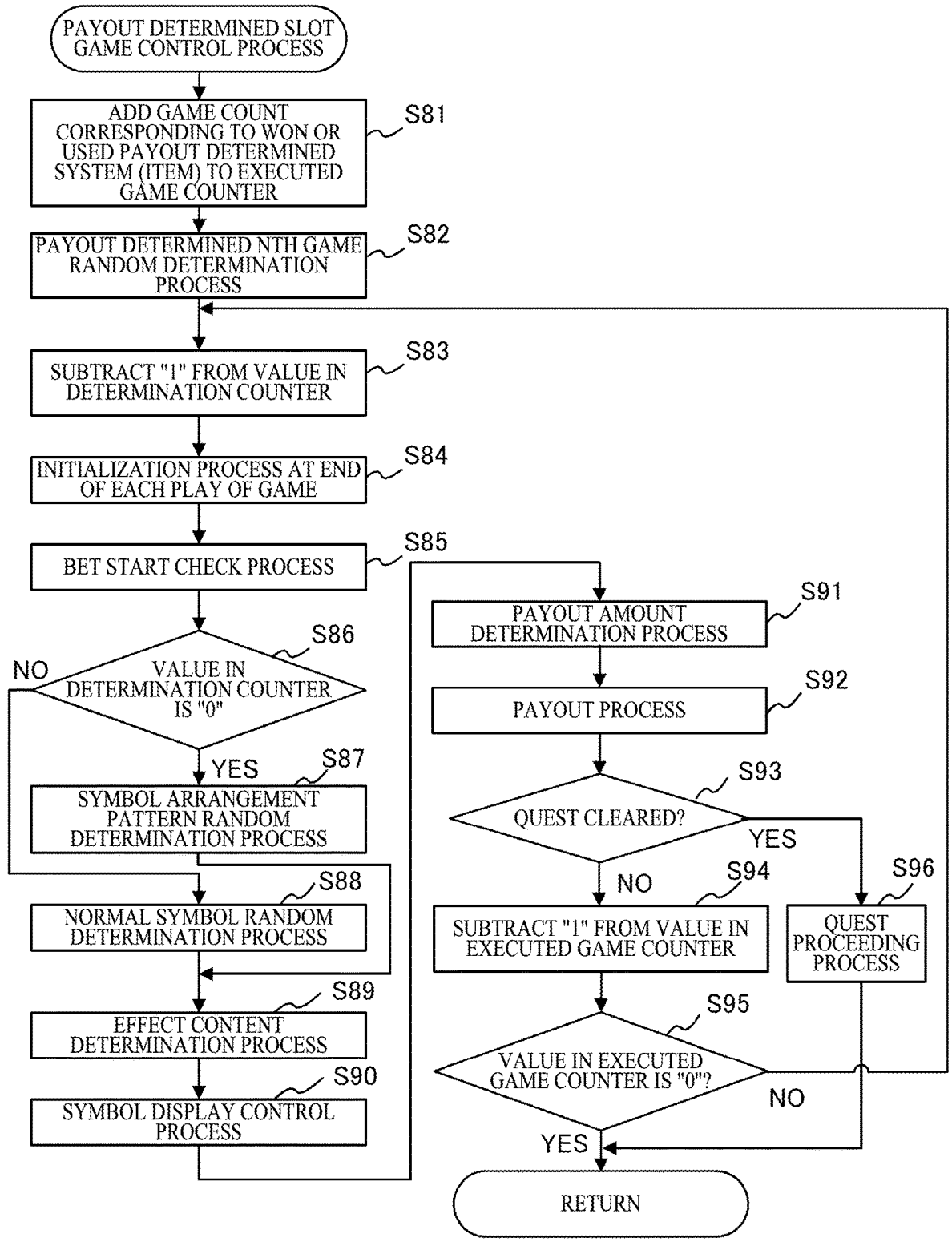
FIG. 7 is a flowchart showing a payout determined slot game control process according to the embodiment of the present invention.

"GIGA WIN determination symbol combination data" is data used in a symbol arrangement pattern random determination process (FIG. 7 (S87)) described later, and is data used to determine awarding a payout of 60 to 99 times the bet amount, that is, a coin amount bet at the start of the slot game (unit game) when execution of "GIGA WIN determination" is won in a payout determined random determination (FIG. 6 (S9)) in the process of progressing the slot game. In the "GIGA WIN determination symbol combination data" in the present embodiment, 10 kinds of symbol combinations displayed on the symbol display area 21 (FIG. 3) are set, and payouts corresponding to the 10 kinds of symbol combinations are set such that the payouts are always 60 to 99 times the bet coin amount.

For example, when 3 kinds of "JACK" are established, as a symbol combination, on a payline on which the upper stage of the reel R1, the upper center stage of the reel R2, and the lower center stage of the reel R3 are set as a part of the payline, among a plurality of preset paylines, it can be seen that the count of coins that can be obtained from a winning is "30" based on a payout table shown in FIG. 4. Further, 4 kinds of "WATERMELON" are established on another payline at the same time, and thus, it can be seen that the count of coins that can be obtained from a winning is "50" based on the payout table shown in FIG. 4. Therefore, in a symbol combination in which these combinations are established at the same time, the count of coins that can be obtained from a winning is "10"+"50"="60". It should be noted that the payout is a value obtained by multiplying the count of coins by a BET rate. It should be noted that the payout is determined by multiplying by the BET rate corresponding to the BET count. For example, when the BET count is BET300, the BET rate is 10 times, when the BET count is 12000BET, the BET rate is 40 times, and the BET rate is changed according to the BET count. In the present embodiment, there are a plurality of kinds of combinations of the symbols in the payout table (FIG. 4), and the payout is determined for each combination. One with a particularly large total payout of the combinations is referred to as "GOD WIN" or "GIGA WIN".

It should be noted that a probability that any of the 10 kinds of symbol combinations set in the "GIGA WIN determination symbol combination data" in the present embodiment is determined in random determination is evenly 1/100, but the random determination probability is not limited thereto and may be set to be different.

In addition, this "GIGA WIN determination symbol combination data" is also used when the player himself/herself uses "GIGA WIN determination (during 100 games)" or the like as a payout determined item.

"GOD WIN determination symbol combination data" is data used in the symbol arrangement pattern random determination process (FIG. 7 (S87)) described later, and is data used to determine awarding a payout of 100 times or more the bet amount, that is, the coin amount bet at the start of the slot game (unit game) when execution of "GOD WIN determination" is won in the payout determined random determination (FIG. 6 (S9)) in the process of progressing the slot game.

In the "GOD WIN determination symbol combination data" in the present embodiment, 10 kinds of symbol combinations displayed on the symbol display area 21 (FIG. 3) are set, and payouts corresponding to the 10 kinds of symbol combinations are set such that the payouts are always 100 times or more the bet coin amount.

For example, when 3 Kinds of "ACE" are established, as a symbol combination, on a payline on which the upper stage of the reel R1, the upper stage of the reel R2, and the upper stage of the reel R3 are set as a part of the payline, among the plurality of preset paylines, it can be seen that the count of coins that can be obtained from a winning is "10" based on the payout table shown in FIG. 4. Further, when 4 Kinds of "BELL" are established on another payline (a payline on which the upper center stage of the reel R1, the upper center stage of the reel R2, the upper center stage of the reel R3, and the upper center stage of the reel R4 are set as a part of the payline) at the same time, it can be seen that the count of coins that can be obtained from a winning is "100" based on the payout table shown in FIG. 4. Therefore, in a symbol combination in which these combinations are established at the same time, the count of coins that can be obtained from a winning is "10"+"100"="110". It should be noted that the payout is a value obtained by multiplying the count of coins by the BET rate.

It should be noted that a probability that any of the 10 kinds of symbol combinations set in the "GOD WIN determination symbol combination data" in the present embodiment is determined in random determination is evenly 1/100, but the random determination probability is not limited thereto and may be set to be different.

In addition, this "GOD WIN determination symbol combination data" is also used when the player himself/herself uses "GOD WIN determination (during 100 games)" or the like as a payout determined item.

(Payout Table)

Next, the payout table will be described with reference to FIG. 4. FIG. 4 is a diagram illustrating the payout table used in the slot game according to the present embodiment.

The payout table of the slot game defines the coin payout amount (payout) for a combination of patterns of symbols related to a winning (WIN) (symbol arrangement pattern). In the slot game, a winning is achieved when scrolling of the five video reels is stopped, and three or more symbols of the same kind are continuously rearranged on a payline to be subjected to winning determination in the symbol display area 21 (see FIG. 4). Then, a privilege such as a payout is awarded to the player according to the winning. It should be noted that a payout value described in the payout table shown in FIG. 4 is a payout value when the count of bet coins is one.

(Outline of Adventure Mode)

In the game provided in the present embodiment, a plurality of stages for executing the above slot game are prepared. A plurality of quests are prepared for each stage. The player can execute a slot game in each quest, earn a payout from the slot game, and acquire an item for advantageously advancing the game.

Figure 5:
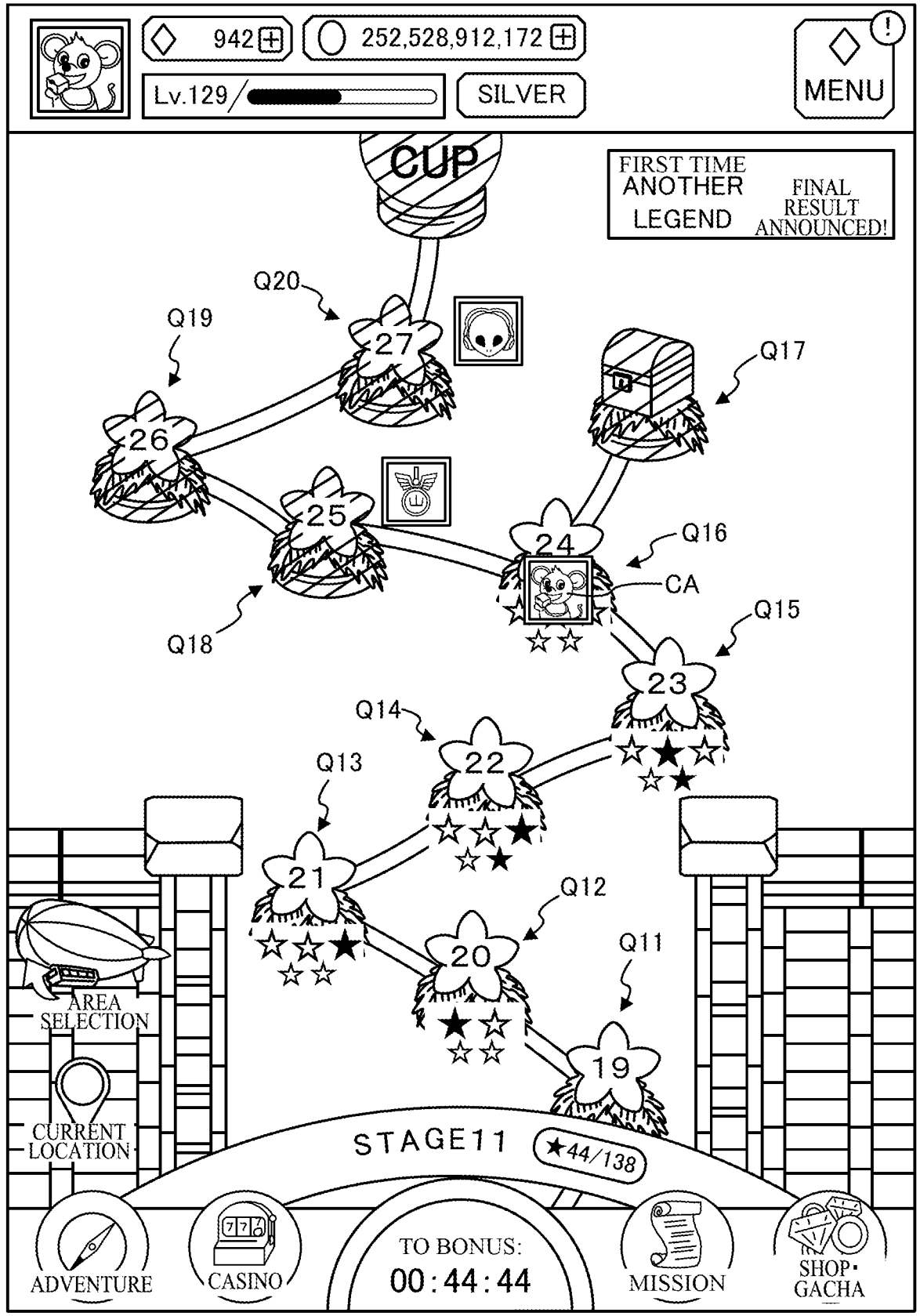
FIG. 5 is a schematic diagram showing a state in which a stage map of the slot game is displayed on a display of the smartphone (information processing device) according to the embodiment of the present invention.

As shown in FIG. 5, a map for executing the slot game is displayed for each stage on the display 120 of the smartphone 1. A plurality of quests Q11 to Q20 are set for each stage, and a slot game is prepared for each of the quests Q11 to Q20.

The player can set a character CA representing himself/herself, determine a destination of the character CA by operating the touch panel 5, and execute the slot game while sequentially advancing the character CA to the quests Q11 to Q20.

Specifically, when the player operates the character CA to advance the game to the first quest Q11, scroll screens of the reels R1 to R5 shown in FIG. 3 are displayed on the display 120, whereby the slot game can be executed. A condition to be cleared is set for each of the quests Q11 to Q20. When the player executes a plurality of times of the slot game offered within a quest, the player can release a quest (for example, the quest Q12) following the quest (for example, the quest Q11) by clearing conditions set as a payout to be generated and the game count. When a new quest is released, the player can advance his/her character CA to the new quest (for example, the quest Q12) and challenge the new quest. A plurality of missions are prepared for each of the quests Q11 to Q20, and the player can also challenge each mission while playing the slot game in the quest. The mission count completed in each quest is one of conditions for clearing the stage.

It should be noted that in each slot game of each quest, a name of a prize is given according to an amount of a payout to be awarded by winning. For example, names such as "BIG WIN", "MEGA WIN", "GIGA WIN", and "GOD WIN" are given in an order from a small payout to a large payout.

In addition, by clearing a specific quest prepared for each stage, for example, the player can move from a stage of the quest Q19 to a stage of the next quest Q20, and can challenge the next quest, and when the player shifts to a casino mode by touching a part displayed as "casino" shown in FIG. 5, in the casino mode, a privilege such as releasing any of a plurality of kinds of prepared slot games to a playable state is given. That is, the player can enjoy next game start by clearing the specific quest in the adventure mode, whereby the player can enjoy a sense of accomplishment and it may evoke a desire to continue playing.

[Program Content]

Next, a program process of the slot game executed by the application installed on the smartphone 1 will be described with reference to FIG. 6 and FIG. 7.

(Normal Slot Game Control Process)

First, the normal slot game control process executed by the smartphone 1 will be described with reference to FIG. 6.

First, the CPU 101 determines whether a stage in which the slot game is executed is any of the first three stages (stages 1 to 3) among the plurality of stages (S4). When the stage is not any of the stages 1 to 3 (NO in S4), the CPU 101 proceeds to an initialization process at the end of each play of the game (S13).

On the other hand, when the stage is any of the stages 1 to 3 (YES in S4), the CPU 101 determines whether it is the time to start a quest (S5). When it is determined that it is not the time to start the quest (YES in S5), the CPU 101 determines whether a payout determined system is won by referring to a result of a payout determined random determination process (S9) already performed at the start of the quest (S11).

On the other hand, when it is determined in S5 that it is the time to start the quest (YES in S5), the CPU 101 determines whether "first clear time=null", that is, whether the quest is not cleared at the time. When it is determined that the quest is already cleared (NO in S6), this means trying the same quest again with the quest already cleared, and the CPU 101 causes the process to proceed to S13 in order to start a normal slot game without going through a process by the payout determined system.

On the other hand, when it is determined that the quest is not cleared (YES in S6), this means that it is a timing to start a quest that is never cleared, and the CPU 101 determines whether there is a carry-over of a winning result of the payout determined system (S7).

When it is determined that there is a carry-over (YES in S7), this means that the quest is completed without being activated even though the winning result of the payout determined system is obtained, and the CPU 101 proceeds to a payout determined slot game control process (S12), and executes the slot game in order to activate the already obtained winning result.

On the other hand, when it is determined that there is no carry-over (NO in S7), the CPU 101 determines whether a payout determined item is used (S8). The payout determined item means an item in which a right to determine a payout by "GOD WIN" or "GIGA WIN" in the quest is acquired as an item regardless of random determination.

When it is determined that the payout determined item is used (YES in S8), the CPU 101 prioritizes a process using the payout determined item without performing a new payout determined random determination process, and causes the process to proceed to the payout determined slot game control process (S12). On the other hand, when it is determined that the payout determined item is not used (NO in S8), the CPU 101 executes a new payout determined random determination process (S9).

In the payout determined random determination process (S9), the CPU 101 randomly determines any one of "GOD WIN determination (during 50 games)" that always generates one "GOD WIN" during 50 games, "GIGA WIN determination (during 50 games)" that always generates one "GIGA WIN" during 50 games, and a failure. A winning probability in this random determination is 15% for the "GOD WIN determination (during 50 games)", 35% for the "GIGA WIN determination (during 50 games)", and 50% for a failure.

After the payout determined random determination process (S9), the CPU 101 determines whether a result of the random determination process is wining of the "GOD WIN determination (during 50 games)" or the "GIGA WIN determination (during 50 games)" (winning of the payout determined system) (S11). When the winning result of the payout determined system is not obtained (NO in S11), the CPU 101 causes the process to proceed to S13 in order to start the normal slot game without going through the process of the payout determined system.

On the other hand, when the winning result of the payout determined system is obtained (YES in S11), the CPU 101 causes the process to proceed to the payout determined slot game control process (S12). The details of the payout determined slot game will be described later.

On the other hand, when it is determined in the process of S6 that the quest is already cleared (NO in S6), or when it is determined in the process of S11 that the result of the payout determined random determination process is not winning (NO in S11), the CPU 101 causes the process to proceed to the initialization process at the end of each play of the game (S13) in order to start the slot game without performing the payout determined slot game control process (S12). In the initialization process at the end of each play of the game (S13), the CPU 101 clears, for each unit game in a work area of the RAM 103, unnecessary data such as a valid payline in a previous unit game, a value of a bet counter in a BET count storage area, and a symbol determined to be displayed on the symbol display area 21 by random determination.

Next, the CPU 101 performs a bet start check process (S14). In this bet start check process, a valid payline is determined (in the present embodiment, all paylines are validated). Then, the count of coins bet on the valid payline validated by the player is determined by input check such as an operation of touching a "+" button and a "−" button (see FIG. 3) of the bet button 244 on the operation display area 24 of the display 120 of the smartphone 1. Then, the count of bet coins corresponding to the valid payline is stored in the BET counter of the RAM 103. Thus, when a winning is achieved in the slot game by determining the valid payline and the count of bet coins, a value obtained by multiplying a payout (see FIG. 4) corresponding to the winning (symbol arrangement pattern) achieved on the valid payline by the count of bet coins is a payout in the winning. In addition, in this bet start check process, the CPU 101 determines whether a touch operation on the spin button 241 is performed, and when the touch operation on the spin button 241 is performed, the CPU 101 proceeds to a process of S15 and progresses the slot game.

Next, the CPU 101 performs a normal symbol random determination process (S15). Here, to-be stopped symbols are determined by random determination from a plurality of symbols arranged in the video reels (R1, R2, R3, R4, and R5) shown in FIG. 3. The to-be stopped symbols are data of five symbols displayed on the lower center stages of the columns on the symbol display area 21 among a plurality of symbols forming the video reels. Accordingly, 20 symbols to be displayed on the symbol display area 21 are determined.

Then, the CPU 101 stores the determined five to-be stopped symbols in a symbol storage area provided in the RAM 103.

Next, the CPU 101 performs an effect content determination process (S16). The CPU 101 extracts an effect random number value and determines, by random determination, one of a plurality of predetermined effect contents.

Figure 8:
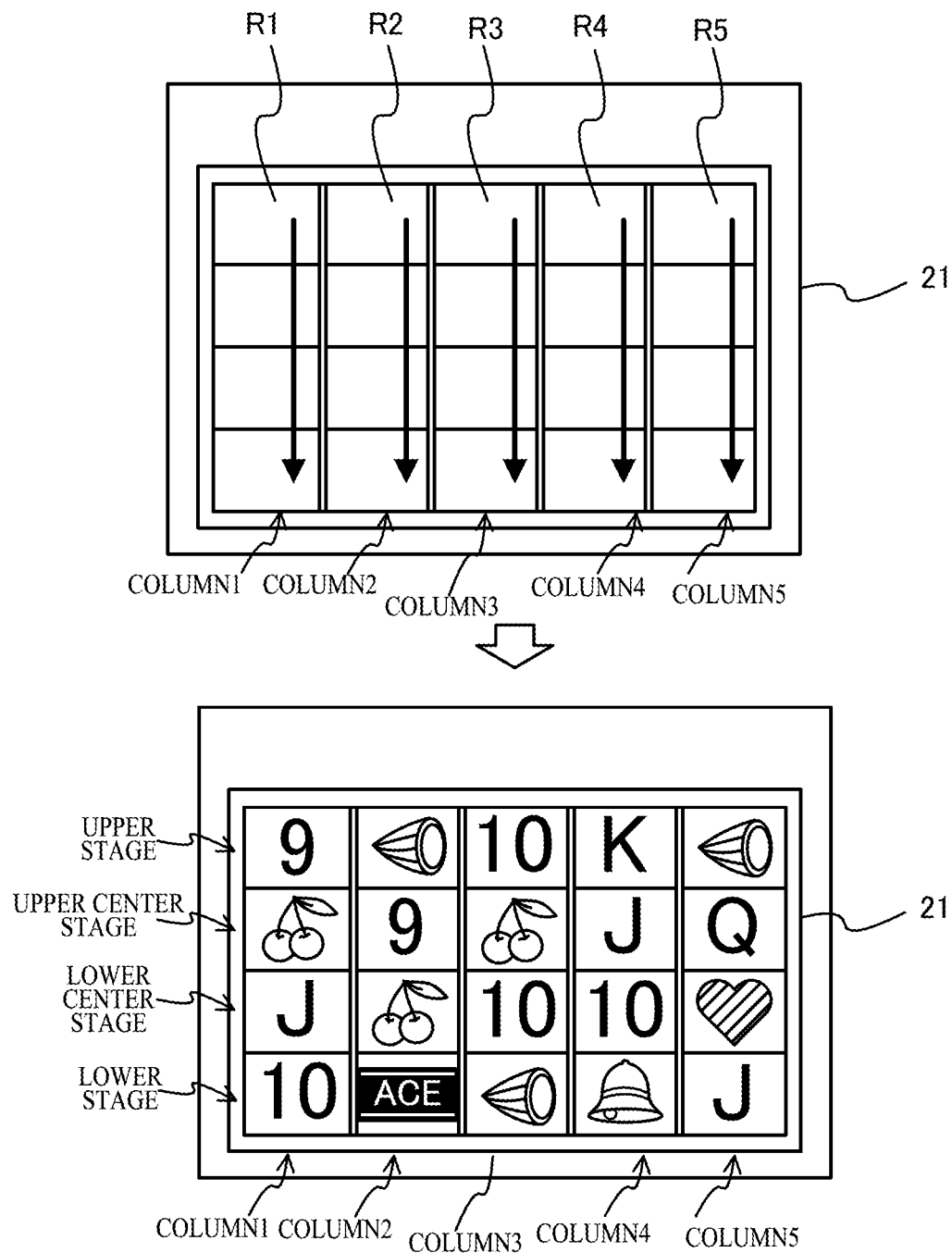
FIG. 8 is a schematic diagram showing a display mode of the display according to the embodiment of the present invention.

Next, the CPU 101 performs a symbol display control process (S17). In this symbol display control process, as shown in FIG. 8, scrolling of the symbol columns of the video reels R1 to R5 is started, and after a predetermined period of time, the five to-be stopped symbols determined in the symbol random determination process of S15 are sequentially rearranged in the lower center stages of the columns 1 to 5 in the symbol display area 21. That is, 20 symbols including the to-be stopped symbols are rearranged in the symbol display area 21. For example, when the symbol "JACK" is determined as the to-be stopped symbol in the video reel R1, the symbol "CHERRY" is determined as the to-be stopped symbol in the video reel R2, the symbol "10" is determined as the to-be stopped symbol in the video reel R3, the symbol "10" is determined as the to-be stopped symbol in the video reel R4, and the symbol "HEART" is determined as the to-be stopped symbol in the video reel R5, "JACK", "CHERRY", "10", "10", and "HEART" are respectively rearranged in the lower center stages of the columns 1 to 5 in the symbol display area 21. In addition, symbols before and after the to-be stopped symbols are rearranged in the upper stages, upper center stages, and lower stages of the columns 1 to 5 in the symbol display area 21 (see FIG. 8).

Next, the CPU 101 performs a payout amount determination process (S18). In this process, based on the symbol combination data of the slot game stored in the RAM 103, it is determined whether three or more symbols of the same kind are continuously rearranged on the valid payline and whether a winning is achieved. Then, a privilege such as a payout is awarded according to a kind of the winning. The awarded payout is stored in a payout amount storage area provided in the RAM 103.

Further, in the payout amount determination process, it is also determined whether a winning of "BONUS" (3 Kinds of "BONUS", 4 Kinds of "BONUS", and 5 Kinds of "BONUS") is achieved. Then, when the winning of "BONUS" is achieved, a free game is executed as a bonus game. In this free game, the player can execute the slot game for the count corresponding to the winning of the achieved "BONUS" without consuming coins. For example, in the case of the 3 Kinds of "BONUS", five times of free games (5FG) can be executed (see FIG. 4).

Next, the CPU 101 performs a payout process (S19). The CPU 101 adds the value stored in the payout amount storage area of the RAM 103 to a value in a coin counter provided in the RAM 103. For example, in the payout amount determination process of S18, when "50" is stored in the payout amount storage area, "50" is added to the value in the coin counter. It should be noted that after the process of S19, it is determined whether a quest clear condition (for example, a total amount of payouts awarded in the quest) is satisfied (S20), and when the quest clear condition is not satisfied (NO in S20), the CPU 101 determines whether to end the game (S22). When a determination result of ending the game is obtained (YES in S22), this may be due to, for example, that the player performs an operation to end the game, and the CPU 101 ends the process after storing the data. On the other hand, when the determination result of ending the game is not obtained (NO in S22), the CPU 101 proceeds to the process of S13. On the other hand, when the quest clear condition is satisfied (YES in S20), the CPU 101 ends the process of the quest and executes a process of proceeding to a next quest (such as a process of releasing the next quest) (S21), and then proceeds to the process of S4.

(Payout Determined Slot Game Control Process)

Next, the payout determined slot game control process will be described with reference to FIG. 7. This payout determined slot game control process is executed when it is determined that the "GOD WIN determination (during 50 games)" or the "GIGA WIN determination (during 50 games)" is won (YES in S11) in the process of S11 in the above normal slot game control process.

First, the CPU 101 adds, to an executed game counter of the RAM 103, the game count (period) corresponding to the payout determined system ("GOD WIN determination (during 50 games)" or "GIGA WIN determination (during 50 games)") won in the payout determined random determination process (S9) or the game count (period) corresponding to the payout determined item determined to be used in S8 (S81). For example, when the payout determined system "GOD WIN determination (during 50 games)" is won in a state in which the payout determined item is not used, "50" is added to the executed game counter of the RAM 103. On the other hand, for example, when the payout determined item is used, the game count specified by the used payout determined item (for example, "100", "200", "300") is added to the executed game counter of the RAM 103. It should be noted that the same applies to the payout determined system "GIGA WIN determination (during 50 games)". Thus, since the game count "50" corresponding to the payout determined system ("GOD WIN determination (during 50 games)" or "GIGA WIN determination (during 50 games)") won in the payout determined random determination process (S9) is the game count (number of rotations) less than the numbers of times of playing the game "100", "200", and "300" corresponding to the payout determined item, it can be said that "50" is advantageous as compared with the case of using the item.

Figure 9:
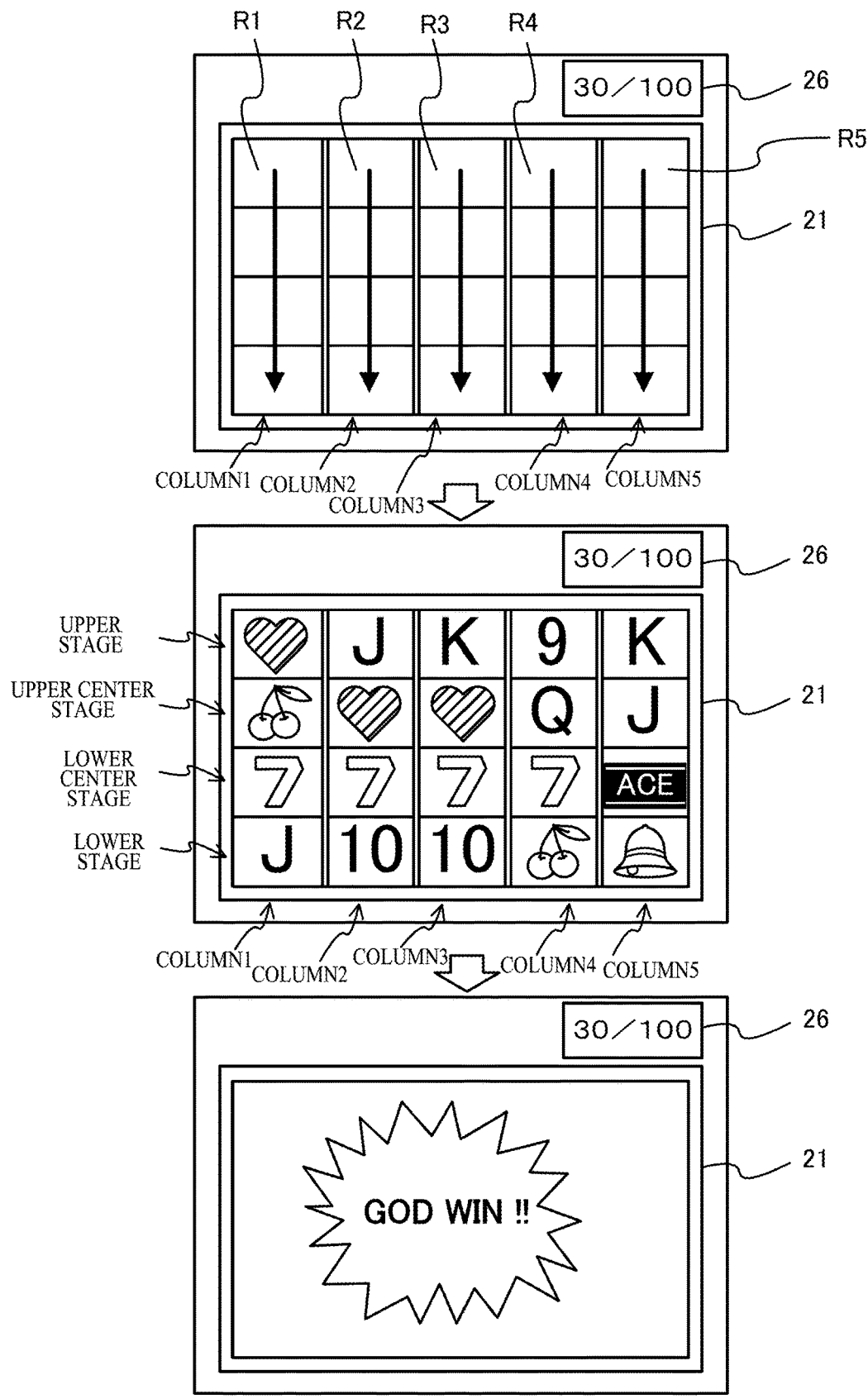
FIG. 9 is a schematic diagram showing a display mode of the display according to the embodiment of the present invention.
Figure 10:
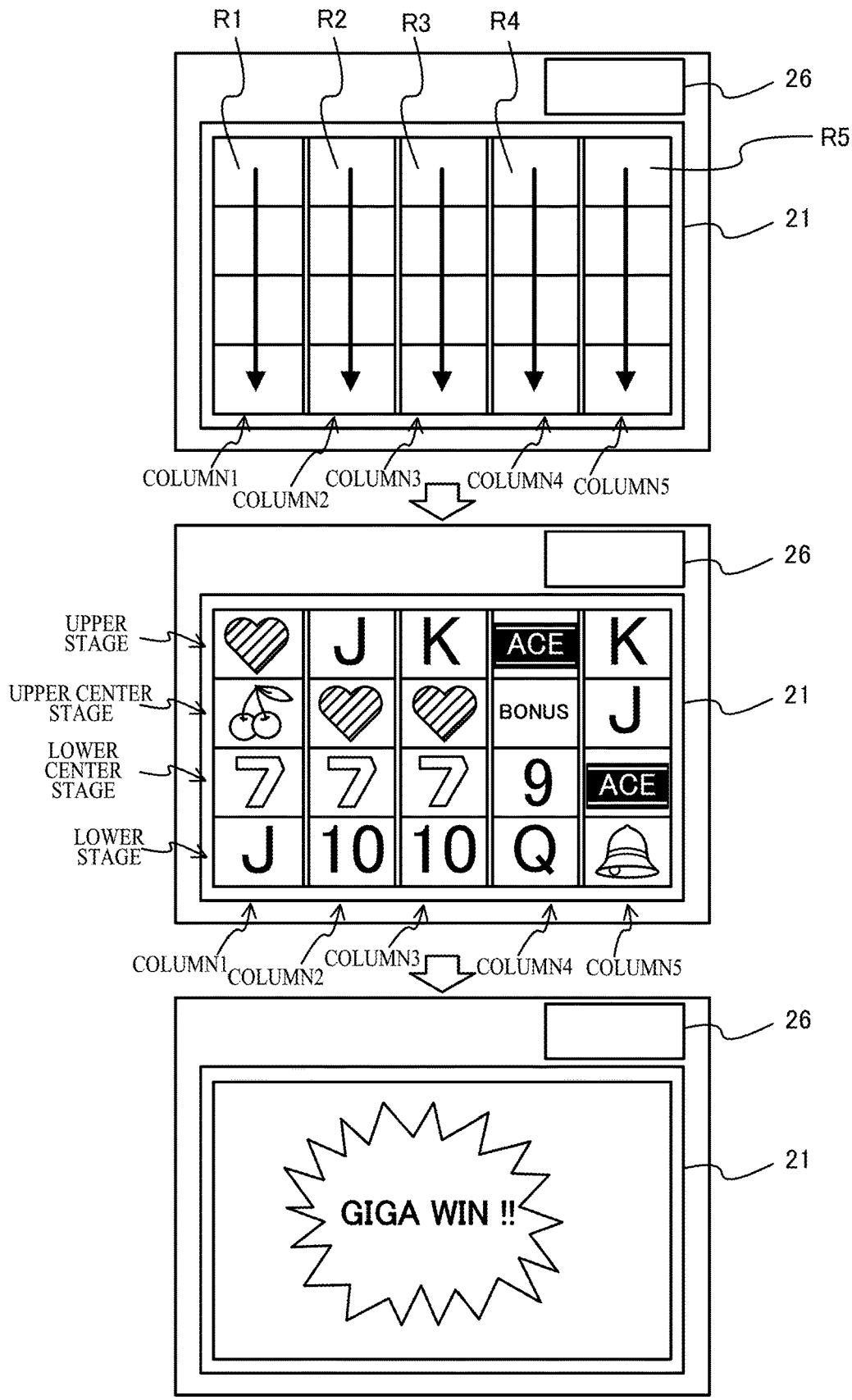
FIG. 10 is a schematic diagram showing a display mode of the display according to the embodiment of the present invention.

It should be noted that when the player selects and uses the payout determined item at his/her own will regardless of the payout determined random determination process (S9), a current value of the executed game counter is reflected and displayed on an executed game count display area 26 in FIG. 9. For example, in a case where the used payout determined item is the "GIGA WIN determination (during 100 games)", when the unit game is executed 30 times in the payout determined slot game control process after the item is used, a value of "30/100" is displayed on the executed game count display area 26 in FIG. 9. Accordingly, when the player uses the payout determined item at his/her own will, the usage status is displayed on a display screen. On the other hand, when the payout determined system is won in the payout determined random determination process (S9) and the "GOD WIN determination (during 50 games)" or the "GIGA WIN determination (during 50 games)" is activated, as shown in FIG. 10, the game count shown in FIG. 9 is not displayed on the executed game count display area 26. Accordingly, it is possible to create an illusion that "GOD WIN" or "GIGA WIN" is won in a normal slot game without making the player aware that the payout determined system is won in the payout determined random determination process (S9).

Next, the CPU 101 executes a payout determined nth game random determination process (S82). In this payout determined nth game random determination process, the nth game (timing) at which a payout corresponding to the payout determined system won in the payout determined random determination process (S9) or corresponding to the payout determined item used based on the selection of the player is awarded is determined by random determination. Then, the determined nth game is stored in a determination counter of the RAM 103 (S82).

Next, the CPU 101 subtracts "1" from a value in the determination counter of the RAM 103 (S83). It should be noted that a negative value can also be counted as the value in the determination counter. For example, in a case where the value in the determination counter is "0", when "1" is subtracted, the value in the determination counter is updated to "−1".

Next, in order to start the slot game, the CPU 101 performs an initialization process at the end of each play of the game (S84) similar to the process of S13.

Next, the CPU 101 performs a bet start check process (S85) similar to the process of S14.

Next, the CPU 101 determines whether the value in the determination counter of the RAM 103 is "0" (S86). Then, when the value in the determination counter is "0" (YES in S86), the CPU 101 executes the symbol arrangement pattern random determination process (S87). In this symbol arrangement pattern random determination process, when the currently executed payout determined system or the currently used payout determined item is the "GIGA WIN determination" or "GIGA WIN determination item", a combination of symbols to be displayed on the symbol display area 21 is determined by random determination by using the "GIGA WIN determination symbol combination data". In addition, when the currently executed payout determined system or the currently used payout determined item is "GOD WIN determination" or "GOD WIN determination item", a combination of symbols to be displayed on the symbol display area 21 is determined by random determination by using the "GOD WIN determination symbol combination data". Then, the "combination of symbols to be displayed on the symbol display area 21 (20 symbols)" determined in the process of S87 is stored, as the to-be stopped symbols, in the symbol storage area provided in the RAM 103.

On the other hand, when the value in the determination counter is not "0" (NO in S86), the CPU 101 performs a normal symbol random determination process (S88) similar to the process of S15. Here, five symbols displayed on the lower center stages of the columns in the symbol display area 21 are determined as the to-be stopped symbols by random determination by using the video reels used in the normal symbol random determination process. Then, the five to-be stopped symbols determined in the process of S88 are stored in the symbol storage area provided in the RAM 103.

Therefore, when the value in the determination counter is "0" (YES in S86), an effect of a winning result of the payout determined random determination process or an effect of the payout determined item selected by the player is exhibited, and the symbol arrangement pattern random determination process (S87) is executed, the normal symbol random determination process executed in the normal slot game control process or the like is not executed, and the symbol arrangement pattern random determination process in which the combination of symbols to be displayed on the symbol display area 21 is determined by random determination is executed.

Next, the CPU 101 performs an effect content determination process (S89) similar to the process of S16. The CPU 101 extracts an effect random number value and determines, by random determination, one of a plurality of predetermined effect contents.

Next, the CPU 101 performs a symbol display control process based on the to-be stopped symbols stored in the symbol storage area (S90). In this symbol display control process, when the to-be stopped symbols are determined by the normal symbol random determination process of S88, as shown in FIG. 8, scrolling of the symbol columns of the video reels R1, R2, R3, R4, R5 is started, and after a predetermined period of time, the to-be stopped symbols (five to-be stopped symbols) determined in the process of S88 are sequentially rearranged in the lower center stages of the columns 1 to 5 in the symbol display area 21. That is, 20 symbols including the to-be stopped symbols are rearranged in the symbol display area 21.

On the other hand, when the to-be stopped symbols are determined by the symbol arrangement pattern random determination process of S87 by using the payout determined item, as shown in FIG. 9, in order to display, on the symbol display area 21, the "combination of symbols" determined in the process of S87, scrolling of the symbol columns of the video reels R1, R2, R3, R4, R5 is started, and after a predetermined period of time, the to-be stopped symbols (20 symbols) determined in the process of S87 are sequentially rearranged in the symbol display area 21. It should be noted that in this case, when a combination of symbols to which a payout of 60 to 99 times the bet coin amount is to be awarded is displayed on the symbol display area 21, a message of "GIGA WIN !!" is displayed on the display 120. In addition, when a combination of symbols to which a payout of 100 times or more the bet coin amount is to be awarded is displayed on the symbol display area 21, a message of "GOD WIN !!" is displayed on the display 120 (see FIG. 9).

On the other hand, when the to-be stopped symbols are determined by the symbol arrangement pattern random determination process of S87 by winning in the payout determined random determination process (S9), as shown in FIG. 10, in order to display, on the symbol display area 21, the "combination of symbols" determined in the process of S87, scrolling of the symbol columns of the video reels R1, R2, R3, R4, R5 is started, and after a predetermined period of time, the to-be stopped symbols (20 symbols) determined in the process of S87 are sequentially rearranged in the symbol display area 21. It should be noted that in this case, when a combination of symbols to which a payout of 60 to 99 times the bet coin amount is to be awarded is displayed on the symbol display area 21, a message of "GIGA WIN !!" is displayed on the display 120 (see FIG. 10). In addition, when a combination of symbols to which a payout of 100 times or more the bet coin amount is to be awarded is displayed on the symbol display area 21, a message of "GOD WIN !!" is displayed on the display 120.

Next, the CPU 101 performs a payout amount determination process (S91). In this process, based on the symbol combination data of the slot game stored in the RAM 103, it is determined whether a winning is achieved. Then, a payout is awarded according to a kind of the winning. Then, the awarded payout is stored in the payout amount storage area provided in the RAM 103.

Next, the CPU 101 performs a payout process (S92). The CPU 101 adds the value stored in the payout amount storage area of the RAM 103 to a value in the coin counter provided in the RAM 103. It should be noted that after the process of S92, it is determined whether a quest clear condition (for example, a total amount of payouts awarded in the quest) is satisfied (S93), and when the quest clear condition is not satisfied (NO in S93), the CPU 101 proceeds to the process of S94. On the other hand, when the quest clear condition is satisfied (YES in S93), the CPU 101 ends the process of the quest and executes a process of proceeding to a next quest (such as a process of releasing the next quest) (S96), and then returns to the normal slot game control process in FIG. 6.

Next, the CPU 101 subtracts "1" from a value in the executed game counter of the RAM 103 (S94).

Next, the CPU 101 determines whether the value in the executed game counter of the RAM 103 is "0" (S95). Then, when the value of the executed game counter is not "0" (NO in S95), the process returns to the process of S83.

On the other hand, when the value in the executed game counter is "0" in the process of S95 (YES in S95), the process ends.

Here, in the present embodiment, for example, when the "GIGA WIN determination (during 50 games)" is won in the payout determined random determination process (S9), during a period when a unit game is executed 50 times, the symbol arrangement pattern random determination process of S87 (using the "GIGA WIN determination symbol combination data") is certainly executed once, and the payout of 60 to 99 times the bet coin amount is certainly awarded once, but it does not mean that during the period when a unit game is executed 50 times, the count the payout of 60 to 99 times the bet coin amount is awarded is limited to once, and does not exclude a payout awarded as a result of the normal symbol random determination of S88 (the payout of 60 to 99 times the bet coin amount). That is, even when the item of "GIGA WIN determination (50 games)" is used, if the payout of 60 to 99 times the bet coin amount is awarded as the result of the normal symbol random determination of S88, during the period when a unit game is executed 50 times, the payout of 60 to 99 times the bet coin amount may be awarded twice or more. In addition, for example, when the item of "GIGA WIN determination (during 100 games)" is used by the player (YES in S8), during a period when a unit game is executed 100 times, the symbol arrangement pattern random determination process of S87 (using the "GIGA WIN determination symbol combination data") is certainly executed once, and the payout of 60 to 99 times the bet coin amount is certainly awarded once, but even in this case (when the item is used), similarly, it does not mean that during the period when a unit game is executed 100 times, the count the payout of 60 to 99 times the bet coin amount is awarded is limited to once, and does not exclude a payout awarded as a result of the normal symbol random determination of S88 (the payout of 60 to 99 times the bet coin amount). That is, even when the item of "GIGA WIN determination (during 100 games)" is used, if the payout of 60 to 99 times the bet coin amount is awarded as the result of the normal symbol random determination of S88, during the period when a unit game is executed 100 times, the payout of 60 to 99 times the bet coin amount may be awarded twice or more.

Thus, in either of the case of winning in the payout determined random determination process or the case of using the payout determined item, a payout of a predetermined rate (60 to 99 times for the "GIGA WIN determination" and 100 times or more for the "GOD WIN determination") of bet coins is certainly awarded once within the game count set in the payout determined system. When the payout determined item is used, as shown in FIG. 9, the current value in the executed game counter is displayed on the executed game count display area 26, and the player knows that the effect of the payout determined item (for example, the item of "GOD WIN determination (during 100 games)") is exhibited, while when the payout determined system is activated as the result of the payout determined random determination process (S9), as shown in FIG. 10 (when the "GIGA WIN determination" is activated), it is in a process mode in which since the current value of the executed game counter is not displayed on the executed game count display area 26, the player does not know whether the payout is the payout awarded as the result of the normal symbol random determination process of S88 or the payout as the result of the payout determined random determination process (S9). Accordingly, when a high payout is generated due to the winning result of the payout determined random determination process (S9), interest of the player in the game can be increased by obtaining the high payout even though the payout determined item is not used. In particular, since the payout determined random determination process S9 is executed in the first three stages, the interest of the player can be attracted by making it easy for a high payout to be generated in the three stages after starting the game. That is, a player who starts the game can obtain a high payout such as "GIGA WIN" and "GOD WIN" at an initial stage, whereby the player can have fun from the game and can easily continue the game. In addition, when the player is a beginner, the player can be interested in the game by having a successful experience in obtaining a high payout such as "GIGA WIN" and "GOD WIN" without using an item.

Further, for example, in a case where the quest clear condition is that a cumulative amount of payouts generated in the quest reaches a certain amount of payout, a difficulty level of clearing the quest is lowered by an increase in a probability of awarding a high payout such as "GIGA WIN" and "GOD WIN" by winning in the payout determined random determination process (S9). As a result, a continuation rate of the player continuing the game without giving up partway is improved.

In addition, in the symbol arrangement pattern random determination process of S87, when the currently used payout determined item or the payout determined system won in the payout determined random determination process (S9) is the "GIGA WIN determination item", a combination of symbols to be displayed on the symbol display area 21 is determined by random determination by using the "GIGA WIN determination symbol combination data". Further, when the currently used payout determined item or the payout determined system won in the payout determined random determination process (S9) is "GOD WIN determination item", a combination of 20 symbols to be displayed on the symbol display area 21 is determined by random determination by using the "GOD WIN determination symbol combination data". Accordingly, since one symbol combination is determined by random determination from a plurality of kinds of symbol combinations, a plurality of kinds (10 kinds in the present embodiment) of payouts corresponding to "GIGA WIN" or "GOD WIN" can be set. Accordingly, a winning probability for the payout of "GIGA WIN" or the payout of "GOD WIN" can be easily improved within a predetermined period of time (such as in 50 games or in 100 games). In addition, a plurality of kinds of "GIGA WIN" payouts or "GOD WIN" payouts are associated with a payout that is a predetermined number of times the received bet amount (for "GIGA WIN", the payout is 60 to 99 times the bet coin amount, and for "GOD WIN", the payout is 100 times or more the bet coin amount). Accordingly, a winning probability for the payout of "GIGA WIN" or the payout of "GOD WIN" can be easily improved.

Other Embodiments

In the above embodiment, when the payout determined system is won, the timing such as the predetermined game count (for example, 50 games) at which the payout determined system is won is determined by random determination (S82). Alternatively, the timing may be determined in advance, and the payout determined system may be won at a determined timing (nth game) regardless of the random determination.

Further, in the above embodiment, the case where the "GIGA WIN determination (during 50 games)" or the "GOD WIN determination (during 50 games)" or the failure is determined by random determination in a random determination process (payout determined random determination process (S9)) has been described. However, the present invention is not limited thereto, and regardless of random determination, for example, "BONUS probability three times", "BIG WIN probability five times", and "MEGA WIN probability 10 times" may be activated, the "GIGA WIN determination (during 50 games)" may be activated at the start of the quest and the effect may be eliminated at the end of the effect (battle) executed in the quest, or the "GOD WIN determination (during 50 games)" may be activated at the start of the quest and the effect may be eliminated at the end of the effect (battle) executed in the quest.

Further, in the above embodiment, the case where the payout determined random determination process (S9) is performed once at the start of the quest has been described. However, the present invention is not limited thereto, and for example, the payout determined random determination process may be performed a plurality of times within the same quest and a difficulty level of clearing the quest may be lowered across a plurality of stages.

In addition, in bonus stages at all stages, for example, random determination in which either "GIGA WIN determination (during 30 games)" or "GOD WIN determination (during 30 games)" is certainly won may be performed at the start (for example, a winning probability of "GIGA WIN determination (during 30 games)" is 70%, and a winning probability of "GOD WIN determination (during 30 games)" is 30%). Even in this case, by executing a process such that the player does not know that "GIGA WIN determination (during 30 games)" or "GOD WIN determination (during 30 games)" is won based on the random determination result, the player can experience successful winning in a high payout during the first 30 games without using an item. It should be noted that when an effect obtained by the player in a previous game (for example, a previous quest) continues, the effect may be canceled and the random determination may be performed again. In addition, when a specific game such as a game advantageous to the player is started, by displaying explanation on the display 120 and then performing countdown display such as "3", "2", and "1", the player can enter the game at a better tempo than a case of performing the countdown display and then displaying the explanation. Further, in such a game advantageous to the player, the player can play the game at a good tempo by making it possible to use only a so-called speed item such as increasing a spin speed of the reel.

The slot game executed in the above embodiment may be installed and executed, as game software (a program, game data), in an information processing device such as a portable information device other than the above smartphone, a portable computer or a laptop computer, a notebook personal computer, a tablet personal computer, a handheld personal computer, and a personal data assistant (PDA). In this case, the game software executing the slot game is downloaded from a server or the like by a communication unit and stored in a storage device (flash memory or the like) in the portable information device. It should be noted that the communication unit may be a transmission line capable of bidirectional communication such as the Internet and a cable television, or may be a broadcast transmitting information in only one direction.

Further, the game software executing the slot game may be stored in a storage medium such as a CD-ROM, a DVD-ROM, a magneto-optical disc (MO), a hard disk, and a flash memory, and may be read from the storage medium as needed and installed in the storage device in the information processing device such as the smartphone 1.

Further, the description content in the above embodiment may be implemented as a game program executed between each smartphone (information processing device) 1 and the server 10 via the Internet (communication line). In this case, the CPU 101 of the smartphone 1 and the CPU 1101 of the server 10 function as a controller of the game system 100 including the smartphone 1 and the server 10. Further, in this case, the game program may be stored in a storage medium such as a CD-ROM, a DVD-ROM, a magneto-optical disc (MO), a hard disk, and a flash memory, and may be read from the storage medium as needed.

Further, the game program executed in the above embodiment may be stored in a storage medium (MEDIUM).

Although the embodiments of the present invention have been described above, only specific examples are exemplified, the present invention is not particularly limited, and a specific configuration of each unit or the like can be appropriately changed in design. In addition, the effects described in the embodiments of the present invention are merely listed as the most preferred effects arising from the present invention, and the effects according to the present invention are not limited to those described in the embodiments of the present invention.

REFERENCE SIGNS LIST

1: smartphone (information processing device)
5: touch panel
21: symbol display area
24: operation display area
243: ITEM button
100: server
101: CPU
102: ROM
103: RAM
104: flash memory
120: display
131: control unit
132: storage unit

The invention claimed is:

1. An information processing device configured to execute a game in which symbol random determination for determining symbols to be rearranged is executed, and when an arrangement pattern of the determined symbols corresponds to one of a plurality of kinds of preset arrangement patterns, a payout corresponding to the arrangement pattern is awarded, the information processing device comprising:
   a controller programmed to execute
      a) a process of executing random determination as to whether to rearrange the symbols in an arrangement pattern corresponding to a specific payout among the payout, and
      b) a process of rearranging the symbols in the arrangement pattern corresponding to the specific payout and awarding the specific payout within a predetermined period of time regardless of whether the symbol random determination is executed, when a random determination result in the process a) wins a prize.

2. The information processing device according to claim 1, wherein
   the controller executes
      a quest including a plurality of the games to be sequentially executed, and
      c) a process of granting a right to execute a new quest when a predetermined condition is cleared due to accumulation of payouts.

3. The information processing device according to claim 2, wherein
   the controller further executes
      d) a process of, when the random determination result in the process a) wins a prize and the quest is completed before the symbols are rearranged in the arrangement pattern corresponding to the specific payout in the process b), passing on the winning result to a next quest.

4. A non-transitory computer-readable storage medium that stores a game program to be executed by an information processing device configured to execute a game in which symbol random determination for determining symbols to be rearranged is executed, and when an arrangement pattern of the determined symbols corresponds to one of a plurality of kinds of preset arrangement patterns, a payout corresponding to the arrangement pattern is awarded, the game program causing the following processes to be executed in executing the game
   a) a process of executing random determination as to whether to rearrange the symbols in an arrangement pattern corresponding to a specific payout among the payout, and
   b) a process of rearranging the symbols in the arrangement pattern corresponding to the specific payout and awarding the specific payout within a predetermined period of time regardless of whether the symbol random determination is executed, when a random determination result in the process a) wins a prize.

5. The non-transitory computer-readable storage medium according to claim 4, wherein the following processes further comprising:
   a quest including a plurality of the games to be sequentially executed, and
   c) a process of granting a right to execute a new quest when a predetermined condition is cleared due to accumulation of payouts.

6. The non-transitory computer-readable storage medium according to claim 5, wherein the following processes further comprising
   d) a process of, when the random determination result in the process a) wins a prize and the quest is completed before the symbols are rearranged in the arrangement pattern corresponding to the specific payout in the process b), passing on the winning result to a next quest.

7. An information processing device configured to execute a game in which first random determination for determining symbols to be rearranged is executed, when an arrangement pattern of the determined symbols corresponds to one of a plurality of kinds of preset arrangement patterns; a quest including a plurality of unit games configured to award payouts corresponding to the arrangement pattern is executed; and when a predetermined condition is cleared due to a cumulative amount of the payouts clears, a right to execute a new subsequent quest is granted,
   the information processing device comprising:
   a controller programmed to execute
      a) a process of executing second random determination which is activated during the quest before the quest starts, the second random determination being random determination for determining a winning or a failure, and
      b) a process of, when the quest starts, in a case where the winning is achieved in the second random determination, activating a result of the second random determination in the plurality of unit games which are sequentially executed.

* * * * *